Sept. 11, 1928.                                                              1,684,231
A. LEVEDAHL
STUD DRIVER
Filed April 20, 1925
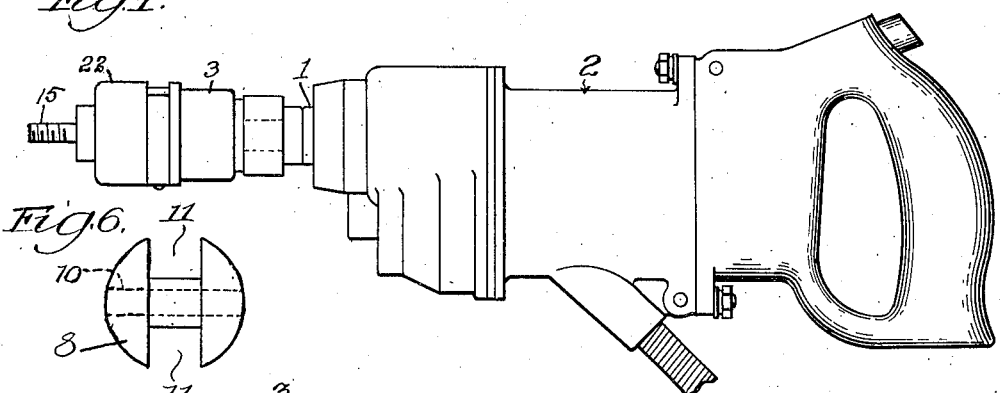
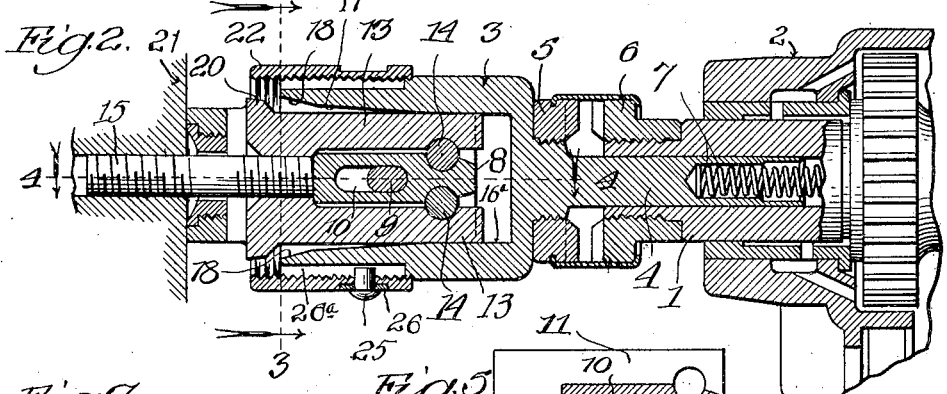
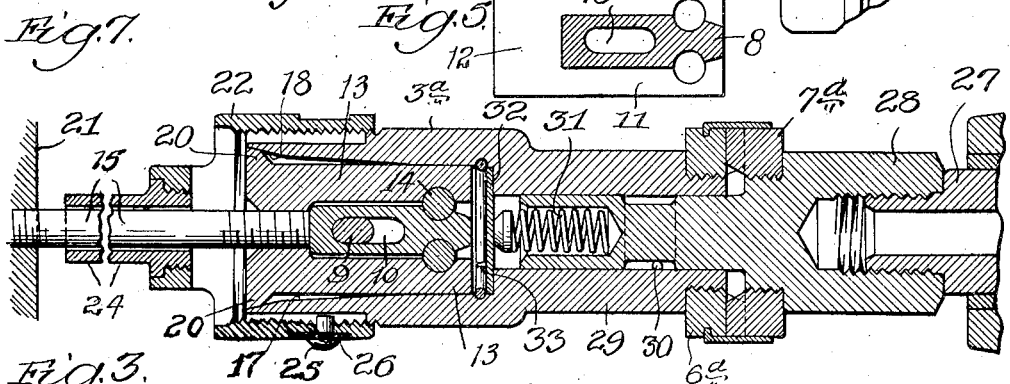
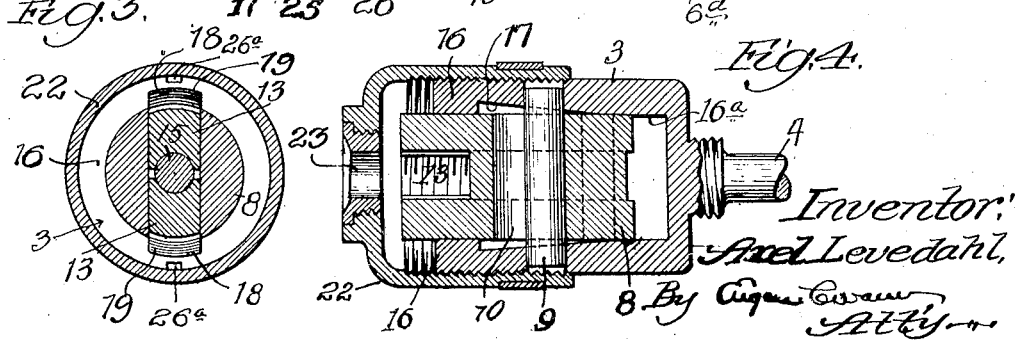
Inventor:
Axel Levedahl Patented Sept. 11, 1928.

1,684,231

UNITED STATES PATENT OFFICE.

AXEL LEVEDAHL, OF AURORA, ILLINOIS, ASSIGNOR TO INDEPENDENT PNEUMATIC TOOL COMPANY, OF CHICAGO, ILLINOIS, A CORPORATION OF DELAWARE.

STUD DRIVER.

Application filed April 20, 1925. Serial No. 24,697.

This invention relates to stud driving attachments for portable electric and other power driven drills for the quick driving of studs by power and for the quick automatic release of the studs when set.

One object of my invention is to have the slots in the jaw holder of the tool engage the sides of the jaws throughout the length of the same for holding the jaws in perfect alignment and thus enable the jaws to engage the studs to be driven without damaging the threads thereof.

Another object of my invention is to have separate fulcrum pins for the jaws with the pins some distance from the longitudinal center of the jaw holder so that the outer ends of the jaws will open substantially parallel to afford a quick release of the entire threaded portion at the jaws and thus avoid setting the stud beyond the depth required.

A further object of my invention is to provide the driver with a guide having an opening aligned with the jaws for centering the stud and guiding the same into the space between the jaws on applying the tool to the stud without damaging the threads on the stud.

A still further object of my invention is to employ the stud guide as an automatic stop for releasing the stud from the jaws on the contact of the guide with the material into which the stud is being driven.

Another object of my invention is to make the guide adjustable on the driver for setting studs to different depths and also for accommodating studs of different lengths.

Other and further objects of my invention will appear from the following specification taken in connection with the accompanying drawings, in which—

Fig. 1 is a side view of a portable power driven drill having attached thereto a stud driver of my invention;

Fig. 2 is a vertical longitudinal sectional view on an enlarged scale through the driver and the associated parts of the drill mechanism;

Fig. 3 is a cross-sectional view taken on line 3—3 of Fig. 2;

Fig. 4 is a longitudinal sectional view on line 4—4 of Fig. 2;

Fig. 5 is a vertical sectional view through the jaw holder, the jaws being removed;

Fig. 6 is a front view of said holder; and

Fig. 7 is a modified form of the attachment for a larger drill.

In Fig. 1, I have shown a stud driver of my invention attached to the spindle 1 of a portable electric drill 2.

Said driver, as shown in Fig. 2, has a socketed member 3 having a shank 4 extending into the hollow spindle 1 of the drill. Co-operating clutch members 5, 6 are on the shank 4 and spindle 1, respectively, to connect the two together when the tool is forced against the work. A coiled spring 7 acting on the shank 4 normally holds the clutch members apart when the tool is released from the work so that the drill may be kept running during the entire stud setting operation.

A cylindric jaw holder 8 is slidably retained in the socket of member 3 by a pin or key 9 carried by and extending across the socket through an elongated slot 10 in the center part of the holder, as shown in Figs. 2, 4, and 7. Said pin is flattened to provide a better wearing surface for the slot.

The holder 8 has two longitudinal slots 11, 11 on opposite sides thereof and extending the full length of the same, as shown in Fig. 5. Said slots 11 are connected by a cross-slot 12 formed in the front end of the holder, as shown.

In the slots 11, 11 are stud engaging jaws 13, 13, one in each slot, and fulcrumed therein at their inner ends on cylindric cross-pins 14, 14. The jaws extend the full length of the slots 11 with the sides of the slots in contact with the sides of the jaws to hold them in perfect alignment so as to engage the threaded portion of a stud 15 to be driven without injury to the threads thereof. The pins 14 are some distance outward from the longitudinal axis of the holder 8, thus allowing the jaws to open substantially parallel and provide a quick release of the entire threaded portion of the stud at the jaws with the advantage heretofore stated. The cross-slot 12 allows the stud to be inserted between the threaded outer ends of the jaws.

The outer end of the holder 8 is supported by an inwardly extending annular flange 16 at the outer end of the socket member 3, and the inner end of the holder is supported by the cylindric inner end portion 16ᵃ of the socket, as shown in Fig. 4. The inner surface of this socket has a slight or gradual outward taper 17 inside of the flange 16 and oppositely disposed sharper or deeper tapers 18 are at the bottoms of the slots 19 extending through the flange 16 at the outer ends of the jaws 13, as shown in Figs. 2, 3, and 7.

The slots 11 open through the holder 8 along the length thereof and the jaws 13 are held in the slots by engagement with the cylindrical wall of the socket to which said jaws conform. Said jaws 13 have lugs 20, 20 at their extreme outer ends, and these lugs are carried into and out of the slots 19, 19 on sliding the outer end of the holder 8 into and out of the socket in member 3, as shown in Figs. 2 and 7, respectively.

When the lugs 20 are beyond the outer end of the socket member 3, as shown in Fig. 2, the slight taper 17 allows the outer ends of the jaws to be swung apart either to receive a stud 15 or release the same, as the case may be. On engaging a stud with the driver and forcing the outer end of the stud against the body 21 (Figs. 2 and 7) into which the stud is to be driven, the jaws first run up on the stud until the latter contacts with the center part of the holder, whereupon the holder is pushed back into the socket of member 3 carrying the lugs 20 against the tapers 18 and tightening the jaws on the stud to drive the same by the tool 1 on engaging of the clutch members 5, 6. As soon as the stud 15 has been set to the extent required, the tool 1 is drawn back from the work, disconnecting the clutch means and at the same time releasing the stud by pulling the outer end of the holder out of the socket and freeing the jaws from the tapers 18.

A cap shaped guide member 22 is fitted over the outer end of the socket member 3 and has screw threaded connection therewith for endwise adjustment, as shown in Figs. 2, 4, and 7. Said member 22 has an opening 23 (Fig. 4) in its outer end and beyond the jaws 13 and in line therewith to guide the stud 15 into the opening between the jaws. When the outer end of the guide 22 strikes against the body 21 into which the stud is being driven, the jaw holder 8 with its jaws 13 is drawn outwardly beyond the tapers 18, releasing the stud 15 and stopping further driving of the same into the body 21. By adjusting the guide 22 on the socket, studs may be set at different depths and also studs of different lengths may be driven by the tool.

As studs vary in length, the guide 22 alone cannot take care of all lengths of studs. To accommodate longer studs, I provide bushings of different lengths and screw them into the guide 22 at its opening 23 so as to extend forward beyond the same to the extent required to support the particular length of stud being driven. In Fig. 7, I have shown at 24 one of these bushings.

Should it not be desired to use the guide 22 for setting the studs at the required depths, the driving of the stud may be stopped when desired by the operator merely pulling the tool toward him. This will draw the holder 8 out of the socket 3 and release the jaws from the stud and also release the clutches 5 and 6 of the tool. To hold the guide 22 in its adjusted positions on the socket or body member 3, I provide a locking pin 25 carried by a spring clip 26 on the outside of the guide and extending inward through and into one of the longitudinal slots 26ª, 26ª on the outside of the socket member 3, as shown in Figs. 2, 3, and 7.

In Fig. 7, I have shown how my improved stud driver will be constructed when attached on the spindle of a larger drill. The spindle 27 carries an extension 28 having a sliding fit in the shank 29 of the driver. A crosspin 30 carried by the shank and extending through an annular groove in the extension 28 allows for ample movement of the parts for connecting and disconnecting the clutches 6ª, 7ª and also prevents the driver from dropping off the spindle. A coil spring 31 in the extension and acting on the same and the attachment through a thrust plate 32 carried by the socket member 3ª separates the clutches when the pressure on the tool holding it to the work is released. The plate 32 is held in place by a split spring ring 33, as shown in Fig. 7. Otherwise the driver has the same construction as heretofore described and as shown in Figs. 1 to 6.

With the slots 11 open the length of the holder 8, the jaws may be readily removed from the pins 14, thereby allowing one set of jaws to be replaced for another size, and in each case the jaws are held laterally, again saving threads on the stud. To facilitate this removal, the jaws engage over less than half of their respective pins, as shown.

The attachment of my invention enables studs to be driven rapidly and quickly by power into wood or metal, the character of threads on ends of the studs entering the material taking the particular form suitable for the material. For metal, machine threads are at the ends of the studs entering the metal so as to be screwed into the threaded bores therein. For wood, the studs could have threads like wood screws to enter the wood unless threaded bores are used, then machine threads could be employed. The tool is well adapted for the automotive industry for the setting of studs in cylinder blocks of gasoline engines for securing cylinder heads thereto. The device is also suitable in building operations for setting studs in structural steel and other wall formations. Being power driven and having a quick automatic release, enables the studs to be set rapidly, thus saving time and labor and in keeping with large production. The tapers 18 and lugs 20 on the body 3 and jaws 13, 13, respectively, constitute coacting cam surfaces on such parts to engage the jaws with a stud and release the jaws from the stud on the sliding movement of the holder 8 in the body member 3 or 3ª.

The details shown and described may be changed and modified without departing from the spirit and scope of my invention.

I claim as my invention:

1. In a stud driver, the combination with a socketed body member, of a holder slidably retained in said socket and having longitudinal slots and a cross-slot at the front end thereof, stud engaging jaws fulcrumed on the holder in the longitudinal slots with the outer ends of the jaws in the cross-slot, and coacting cam surfaces on the jaws and body member, respectively, for engaging the jaws with and allowing the same to be released from a stud on sliding the outer end of the holder into and out of said socket.

2. In a stud driver, the combination with a socketed body member, of a holder in said socket and having an elongated slot therein, a pin fixed to said body member and extending through said slot, stud engaging jaws fulcrumed on the holder on opposite sides of said slot, and coacting cam surfaces on the jaws and body member, respectively, for engaging the jaws with and allowing them to be released from a stud on sliding the outer end of the holder into and out of said socket.

3. In a stud driver, the combination with a socketed body member, of a holder slidably retained therein and having longitudinal slots on opposite sides thereof, stud engaging jaws in said slots and fulcrumed on individual pins, said slots opening along the length of the holder to permit removal and replacement of the jaws, and coacting means on the jaws and holder, respectively, for engaging the jaws with and releasing them from a stud on sliding the holder into and out of said socket.

4. In combination with a power driven spindle, a stud driver having a socketed body member with a hollow shank to receive said spindle, co-operating clutch members on said body member and spindle, respectively, a holder in the socket of said body member, stud engaging jaws fulcrumed on said holder, a thrust plate carried by said body member at the inner end of said holder, and a spring carried by said spindle and acting against said plate to normally separate the clutch members.

5. In a stud driver, the combination with a body member having a socket therein, of a holder slidably retained in said socket, stud engaging jaws fulcrumed on the holder, said holder being approximately as long as the jaws and having longitudinal slots therein to receive the jaws with the sides of the jaws engaging the sides of the slots throughout a considerable portion of the length of the jaws for holding the jaws in alignment, and coacting cam surfaces on the jaws and body member, respectively, for engaging the jaws with and allowing the same to be released from a stud on sliding the outer end of the holder into and out of said socket.

6. In a stud driver, the combination with a body member having a socket therein with an inwardly extending flange at the outer end of the socket, of a holder in said socket and having its outer end slidably supported by said flange, said flange having oppositely disposed slots with outwardly inclined bottom surfaces, and stud engaging jaws fulcrumed on said holder and having cam surfaces at their outer ends to engage the inclined bottoms of said slots, said socket having outwardly tapered surfaces aligned with the bottoms of said slots so that the jaws may separate when projected beyond said flange.

7. In a stud driver, the combination with a body member having a socket therein, of a holder slidably retained in said socket, stud engaging jaws carried by the holder, said holder being approximately as long as the jaws and having longitudinal slots therein to receive the jaws with the sides of the jaws engaging the sides of the slots throughout a considerable portion of the length of the jaws, individual fulcrum pins for said jaws, said pins extending across the slots and being spaced outward from the longitudinal center of the holder so that the jaws may open substantially parallel, and coacting cam surfaces on the jaws and body member, respectively, for engaging the jaws with and releasing them from a stud on sliding the outer end of the holder into and out of said socket.

In testimony whereof he affixes his signature.

AXEL LEVEDAHL.